Oct. 1, 1963  G. A. COLLETTE  3,105,381
ARRANGEMENT FOR MEASURING THE DAMPING OF THE
OSCILLATIONS OF A MECHANICAL SYSTEM
Filed Jan. 31, 1961  2 Sheets-Sheet 1

INVENTOR
GASTON A. COLLETTE
BY
AGENT

Oct. 1, 1963  G. A. COLLETTE  3,105,381
ARRANGEMENT FOR MEASURING THE DAMPING OF THE
OSCILLATIONS OF A MECHANICAL SYSTEM
Filed Jan. 31, 1961  2 Sheets-Sheet 2

INVENTOR
GASTON A. COLLETTE
BY
AGENT

United States Patent Office

3,105,381
Patented Oct. 1, 1963

3,105,381
ARRANGEMENT FOR MEASURING THE DAMPING OF THE OSCILLATIONS OF A MECHANICAL SYSTEM
Gaston Alexandre Collette, Saint Germain-en-Laye, France, assignor to Institut de Recherches de la Sidérurgie Francaise, Saint Germain-en-Laye, France, a professional institution of France
Filed Jan. 31, 1961, Ser. No. 86,228
Claims priority, application France Feb. 24, 1960
8 Claims. (Cl. 73—99)

When it is desired to examine the damping of the oscillations of any mechanical system, it is necessary to measure the modifications in amplitude of such oscillations as a function of the number of oscillations.

My invention has for its object an arrangement for producing automatically said measurements of the modifications in amplitude. Nowadays, when it is desired to measure such a damping, for instance for measuring the internal friction in metals through a pendular method, a mirror is used which is secured to the rocking section of the mechanical system, so as to project the image of a stationary luminous source on to a scale, while an operator following with his eye the luminous spot thus obtained counts the oscillations and measures their amplitude during the flight of the spot. The accuracy of such measurements is obviously very poor.

My invention has chiefly for its object to cut out human interference in such measurements and to remove all the drawbacks and deficiencies which may be produced by such human interference, this being obtained by means of an apparatus which measures automatically the number of oscillations to be executed by the system before the maximum elongation assumes successive previously defined discrete values.

A further object of my invention is to supply an automatic arrangement providing directly a figure which is in a simple relationship with the logarithmic decrement of the oscillations which are being investigated.

These and other objects and advantages are obtained in accordance with the invention by an arrangement for measuring the damping of the oscillations of a mechanical system, which arrangement includes, on the one hand, an opaque rule provided with a plurality of fine parallel transparent slots and a plurality of counting means cooperating with corresponding slots and sensitive to predetermined modifications in illumination and, on the other hand, an optical system secured to the rocking section of the mechanical system considered and adapted to project the image of a luminous source onto said opaque rule, in order that the counting means behind the latter may record the number of times the image of the luminous area illuminates the corresponding slot.

My invention may also show one or more of the following features:

(a) A modulator is inserted in the path of the luminous rays in a manner such that the brilliancy of the luminous area may vary periodically;

(b) The luminous source which produces said luminous area emits a modulated light beam, in a manner such that the brilliancy of said area may vary periodically;

(c) Each of the counting means consists in a photocell associated with an electronic amplifier and a totalizing counter of a known type;

(d) The photo-cells are of a type particularly sensitive to infra-red radiations.

I will now describe, by way of a mere example, and by no means in a limiting sense, an arrangement for measuring the damping of an oscillatory movement in accordance with my invention, so that the latter may be properly understood, reference being had to the accompanying drawings, wherein.

Figure 1:
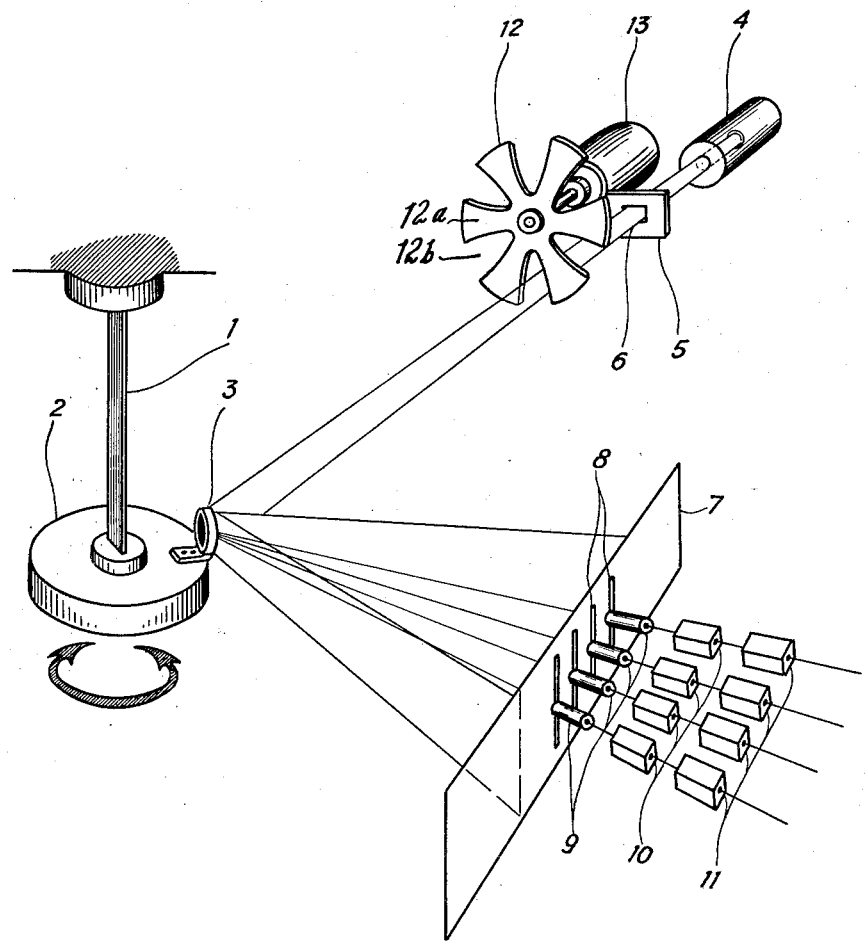
FIG. 1 illustrates diagrammatically an arrangement for measuring the damping in accordance with the invention.

In FIG. 1 is shown a measuring device in accordance with my invention, comprising an oscillating mechanical system which, in the example illustrated, is constituted by an elastic metal sample 1 clamped at one of its ends and coupled with a mass 2 adapted to oscillate with a view to allowing the measurement of internal friction in the sample 1. Said oscillating mass carries a mirror 3 following the oscillatory movement of said mass 2. An incandescent source of light 4 illuminates uniformly a diaphragm 5 in which is provided a rectangular opening 6. The mirror 3 forms a luminous image of said opening 6 on the opaque rule 7 provided with narrow transparent slots 8 aligned in parallel relation with one another. Said rule is constituted by a metal-coated glass plate, the slots being provided through engraving in the metal coat.

Behind each slot is located a very small-sized germanium photo-diode 9. Such diodes are more sensitive to changes in the intensity of infra-red radiation than to visible light. The radiation produced by the source of light 4 contains a large amount of infra-red rays, so that the arrangement may operate as well by daylight or under artificial light, as produced by luminescence without any disturbance. Each photoelectric cell 9 is followed by a detecting amplifier 10 and an electromechanical counter 11. The cell 9, amplifier 10, and counter 11 jointly constitute light sensitive counting means. In the path of the luminous rays issuing from the source of light is inserted a modulating disc 12 comprising angular sectors 12a separated by gaps 12b through which the rays may pass. The disc 12 is driven by a small electric motor 13 at such a speed that the frequency of the light pulses produced is much higher than the frequency of the oscillations to be counted.

Figure 2:
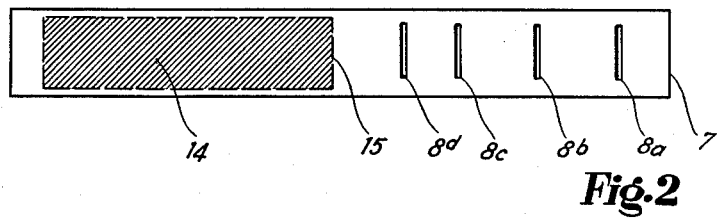
FIG. 2 is a view of the opaque rule provided with slots, with the image of the luminous area in the inoperative position.

In FIG. 2 is illustrated in front view the opaque rule 7 with its transparent slots 8 whereupon is formed the uniformly illuminated image 14 of the opening 6, which image is shown for the inoperative position of the oscillating system 1—2. The image 14 is bounded by a rectilinear terminal leading edge 15 parallel with the slots at which the luminosity of the image drops sharply. The image has a length which is larger than the distance separating the extreme slots of the rule, but in the inoperative condition of the oscillating system, none of the slots are illuminated.

The actual principle of the measurement is well-known per se. It consists in counting the number of oscillations to be executed by the system before the amplitude of the damped movement assumes each of a succession of predetermined discrete values. Said amplitudes are defined by the distances separating respectively the transparent slots 8a, 8b, 8c, 8d, etc. from the position of the leading edge 15 of the image for the inoperative position of the oscillating system.

The operation of the arrangement is as follows:

The oscillating system is started in a manner such that the extreme position of the leading edge 15 ensures illumination of all the slots.

Figure 3:
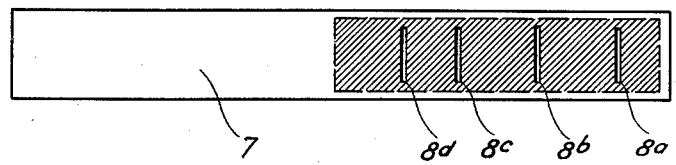
FIG. 3 is a view of the same rule with the image of the luminous area at its maximum original elongation.

FIG. 3 shows the opaque rule, the slots 8 and the extreme position of the luminous image 14, during the first oscillation. The leading edge 15 assuming a reciprocatory movement, the slots $8a$ to $8d$ are then held in succession in darkness and then illuminated, and so on.

The counting means including the parts 9 to 11 located behind each slot are sensitive to a positive modification from darkness to illumination and count the number of times the leading edge passes in a given direction over the corresponding slot.

As a consequence of the damping of the oscillations, the leading edge of the image will, after some time, reach no longer the slot $8a$ and the counting means located behind the last-mentioned slot will stop operating. The same will be the case in succession for the next counting means located behind the slot $8b$, the slot $8c$, the slot $8d$, and so on.

It will be readily understood that the differences between the numbers recorded by the different counters will indicate the number of oscillations executed during the period required for the amplitudes to dropp to the values defined by the slots $8a$, $8b$, $8c$, etc.

If $Aa$, $Ab$, $Ac$, $Ad$, etc. designate the amplitudes defined respectively by said slots $8a$, $8b$, $8c$, $8d$, etc. that is the distances separating the slots from the inoperative position of the leading edge 15 and $Nab$, $Nac$, $Nad$, etc. designate the number of oscillations executed respectively between the moment at which the amplitudes $Aa$ and $Ab$, $Aa$ and $Ac$, $Aa$ and $Ad$, etc. are reached, the logarithmic decrement is given by the known formula:

$$D = \frac{1}{Nab} \log_e \frac{A_a}{A_b} = \frac{1}{Nac} \log_e \frac{A_a}{A_c} = \frac{1}{Nad} \log_e \frac{A_a}{A_d} = \text{etc.}$$

It is therefore apparent from said known formula that it is sufficient to give the amplitudes $Aa$, $Ab$, $Ac$, $Ad$, etc. suitably selected values, so that the number of oscillations $Nab$, $Nac$, $Nad$, etc. may be in a simple relationship with the logarithmic decrement D. In other words the ratio $Aa/Ab$ will be chosen in such a way that $$\log_e \frac{A_a}{A_b}$$

be a number easy to handle, that is, for instance, 1.5—1.2—etc.

Figure 4:
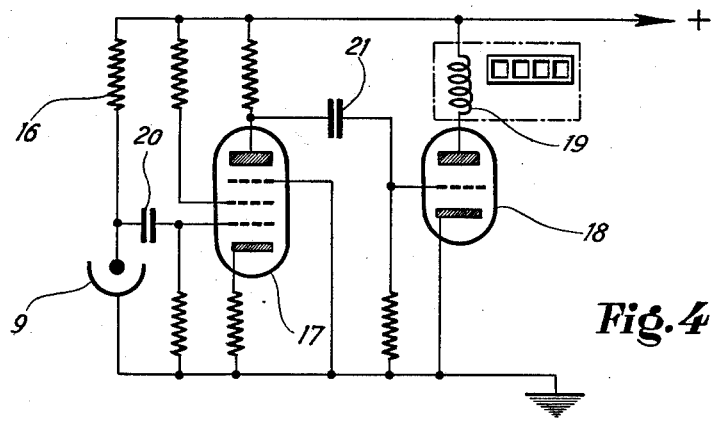
FIG. 4 is a detailed wiring diagram of a counting circuit.

FIG. 4 shows in detail the diagram for each counting circuit, which includes the germanium photo-diode 9 transforming the modifications in luminous intensity received through the corresponding slot into modifications in voltage across the terminals of a loading resistance 16. Said modifications are fed to an amplifier 17, a detecting tube 18 and an electromechanical counter of a decimal type 19. An A.C. voltage, the frequency of which is defined by the modulating disc 12 of FIG. 1 appears across the terminals of the resistance 16 and is amplified by the tube 17, the control grid of which is subjected to said amplified current, through the agency of a condenser 20. The detecting tube 18 is a triode with a high slope, operating as a grid detector, while the anode current of said tube 18 passes through the winding 19 controlling the counter.

When the germanium photo-diode is illuminated by the luminous image, the amplified A.C. voltage available at the anode of the tube 17 is transmitted through the condenser 21 to the control grid of the tube 18, which produces a shifting of the operative point of the tube towards its cut-off value; the D.C. passing through the winding of the counter 19 thus is switched off, so that the counter progresses by one half-unit. As soon as the photo-diode is no longer illuminated, the grid controlling the tube 18 is no longer energized by the A.C. voltage and the D.C. current is restored in the winding of the counter, which progresses again by one half-unit, so that a digit comes into registry with the reading gate. The counter progresses thus by one unit for each complete period of oscillation of the luminous image.

It is thus apparent that when the oscillating system has been started, in the manner disclosed, it is sufficient to wait for the movement to be damped. When all the counters have stopped operating, the difference between the indications given by them allows calculating simply the logarithmic decrement of the oscillations.

Obviously, it is possible, without unduly widening the scope of the invention as defined by the accompanying claims, to devise detail modifications and improvements in the embodiments disclosed and it is also possible to resort to equivalent means for the execution of said invention which is by no means limited to the embodiment more particularly described and illustrated by way of example.

What I claim is:

1. An arrangement for measuring the damping of the oscillations of a mechanical system, comprising an opaque rule provided with a plurality of fine parallel transparent slots, a source of luminous rays, an optical system secured to the oscillating mechanical system for projecting an image of said source on the rule along a section thereof depending on the momentary angular position of the mechanical system to register during each oscillation of the mechanical system with a number of slots increasing with the amplitude of the oscillation, and a plurality of counting means sensitive to predetermined modifications in illumination and respectively located behind said slots.

2. An arrangement for measuring the damping of the oscillations of a mechanical system, comprising an opaque rule provided with a plurality of fine transparent parallel slots, a source of luminous rays, an optical system secured to the oscillating mechanical system for projecting an image of said source on the rule along a section thereof depending on the momentary angular position of the mechanical system to register during each oscillation of the mechanical system with a number of slots increasing with the amplitude of the oscillation, light modulator means inserted in the path of the luminous rays for periodically varying the luminosity of said image and a plurality of counting means sensitive to predetermined modifications in illumination and respectively located behind said slots.

3. An arrangement for measuring the damping of the oscillations of a mechanical system, comprising an opaque rule provided with a plurality of fine parallel transparent slots, a source of modulated luminous rays, an optical system secured to the oscillating mechanical system for projecting an image of said source on the rule along a section thereof depending on the momentary angular position of the mechanical system to register during each oscillation of the mechanical system with a number of slots increasing with the amplitude of the oscillation and a plurality counting means sensitive to predetermined modifications in illumination and respectively located behind said slots.

4. An arrangement for measuring the damping of the oscillations of a mechanical system, comprising an opaque rule provided with a plurality of fine parallel transparent slots, a source of luminous rays, an optical system secured to the oscillating mechanical system for projecting an image of said source on the rule along a section thereof depending on the momentary angular position of the mechanical system to register during each oscillation of the mechanical system with a number of slots increasing with the amplitude of the oscillation, a photo-cell sensitive to predetermined modifications in illumination behind each of said slots, an electronic amplifier fed by each cell, and a totalizing counter controlled by each amplifier.

5. An arrangement for measuring the damping of the oscillations of a mechanical system, comprising an opaque rule provided with a plurality of fine transparent parallel slots, a source of luminous rays, an optical system secured to the oscillating mechanical system for projecting an image of said source on the rule along a section thereof depending on the momentary angular position of the mechanical system to register during each oscillation of the mechanical system with a number of slots increasing with the amplitude of the oscillation, a photo-cell sensitive to infra-red rays behind each of said slots, an electronic amplifier fed by each cell, and a totalizing counter controlled by each amplifier.

6. An arrangement for measuring the damping of oscillations of a mechanical system comprising:
 (a) a body adapted to oscillate;
 (b) a plurality of aligned light sensitive counter means; and
 (c) light source means mounted on said body for oscillating movement therewith and for projecting a beam having an edge at which the intensity of said beam changes sharply, said light source being arranged on said body for sequential passage of said edge over said plurality of counter means during an initial oscillation of said body, the number of the counter means passed by said edge decreasing as the oscillation of said body is damped, said counter means being responsive to the passage of said edge for counting the same.

7. An arrangement as set forth in claim 6, wherein said counter means includes a photoelectric cell responsive to passage of said edge to emit a signal, and a counting apparatus for counting said signal.

8. An arrangement as set forth in claim 7, wherein said beam includes infra-red rays, and said photoelectric cell is selectively sensitive to said infra-red rays.

References Cited in the file of this patent
UNITED STATES PATENTS 2,593,389    Nielson _____ Apr. 15, 1952

FOREIGN PATENTS 649,213    Germany _____ Aug. 18, 1937